May 28, 1963   W. H. GALLAGHER ETAL   3,091,487
CLIP
Filed April 14, 1960
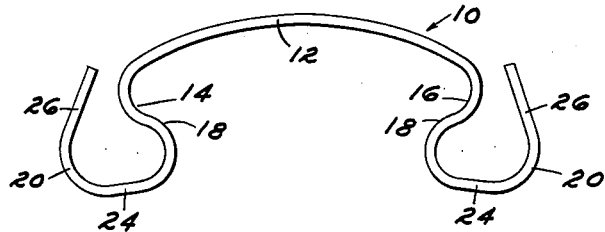
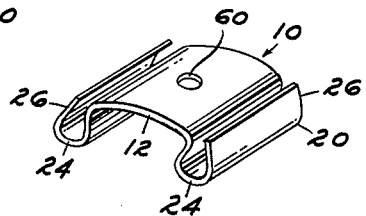
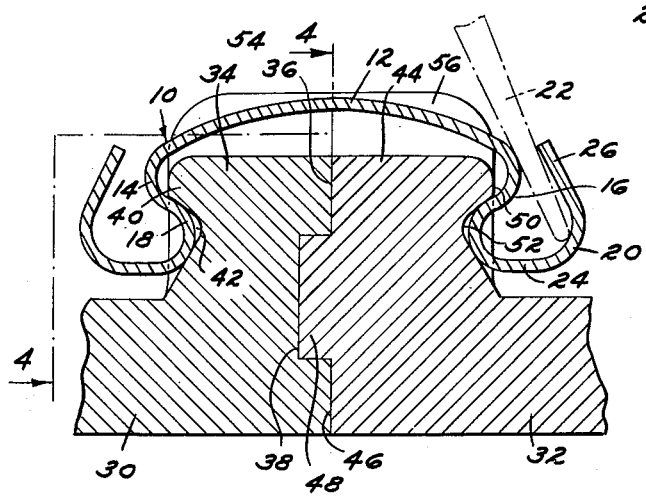
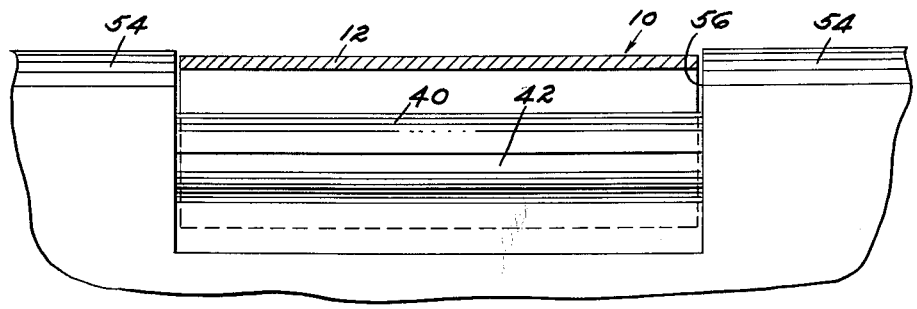
INVENTORS
WILLIAM H. GALLAGER
GEORGE LA FLEUR
BY
*Burton & Parker*
ATTORNEYS

3,091,487
CLIP
William H. Gallagher, 19161 Oakfield, Detroit 35, Mich., and George La Fleur, 1190 Mason, Dearborn 8, Mich.
Filed Apr. 14, 1960, Ser. No. 22,304
2 Claims. (Cl. 287—130)

This invention relates to the mechanical arts. More particularly it relates to a spring clip construction which facilitates easy and rapid removal of the same from, and without damage to, the structure with which the spring clip is engaged.

In fastening together abutting, flanged rims and the like of adjacent parts or components of a structure it is common practice to utilize bolt and screw type fasteners in conjunction with the flanged rims. Placement and tightening down of the screw and bolt type fasteners takes a substantial amount of time and manpower. To disassemble such a structure in which such fastenings are employed, a substantial amount of time and manpower may be involved. Moreover, there is a danger of damage to the components in removing this type of fastener. This is especially true when dealing with fairly light components of a structure in which, under normal use conditions, relatively little stress and strain and load forces are imposed on the flanged rims. An example of such a structure is the reinforced plastic, automobile heater plenum. Indeed, in such a structure, the use of screw and bolt type fasteners results in an excessive material cost and in excessive manpower costs.

An object of this invention is to provide a new and improved fastener which can be readily mounted on abutting, flanged rims of adjacent parts of a structure and which does not require the presence of bolt holes and the like in the flanged rims.

More particularly, it is an object of this invention to provide a new and improved spring clip useful in fastening together abutting, flanged rims of adjacent parts of a structure.

Another object of this invention is to provide a new and improved spring clip useful in attaching one part to another part.

A specific object of this invention is to provide a new and improved spring clip useful for these purposes, which can be readily removed by simple leverage without damage to the parts connected thereby.

Still another specific object of this invention is to provide parts of a structure, which are adapted to receive the new and improved spring clip of this invention, and be connected together thereby and be maintained in relatively stationary position under normal use conditions.

These and other objects which may appear as this specification proceeds are achieved by this invention which shall be described with reference to the accompanying drawings. In the drawings:

FIG. 1 is a side view of a preferred embodiment of the spring clip of this invention;

FIG. 2 is a perspective view of another preferred embodiment of the spring clip of this invention;

FIG. 3 is a longitudinal sectional view of the spring clip of FIG. 1 mounted in position on abutting, flanged rims of two adjacent, partially illustrated, parts of a structure; and FIG. 4 is a partially sectioned end view of the spring clip and corresponding view of the partially illustrated structure of FIG. 3, as indicated generally by the sectioning planes 4—4 of FIG. 3.

Referring to the drawings in greater detail, FIGS. 1, 3 and 4 illustrate a spring clip 10. The spring clip 10 comprises a spring web 12, a transverse leg 14 and a transverse leg 16. Both transverse legs 14 and 16 are integral with the spring web 12 and are on the same side of the spring web 12. One transverse leg 14 is at one end of the spring web 12 while the other transverse leg 16 is at the opposite end of the spring web 12. In this embodiment, it will be observed that the spring clip 10 is longitudinally symmetrical. It will be noted that the spring web 12 is arched or bowed between the transverse legs 14 and 16. The spring web 12 is relatively flexible while the transverse legs 14 and 16, because of their dimensions and construction, are relatively rigid. Each of the transverse legs 14 and 16 present an inwardly projecting detent portion 18. In addition each transverse leg 14 and 16 has an outwardly projecting catch portion 20.

The catch portion 20 in each case is adapted to receive and engage on the inner side thereof one end of a removable, first class lever arm 22 (FIG. 3), such as, for example, the blade of a screw driver. A fulcrum for the lever arm is provided by the spring clip 10 in the region of the end of the spring web 12 adjacent the catch portion 20. In each case the catch portion 20 comprises a second web 24 and a transverse flange 26.

The web 24 is integral with the flange 26 and with that portion of the transverse leg between it and the spring web 12.

The transverse flange 26 is disposed oppositely to said portion of the transverse leg and extends into the region of said fulcrum. Preferably, the transverse flange 26 is inclined towards said fulcrum. Satisfactory results have been obtained with the flange 26 inclined towards said fulcrum to the extent that there is an angle of 20° between the flange 26 and a straight line through the flange perpendicular to a straight line passing through corresponding points of the transverse legs 14 and 16.

It is preferred that the transverse legs curvingly join the spring web 12 and that the second web 24 curvingly join both the detent portion 18 and transverse flange 26. Excellent results have been obtained where the radius of the curved portion of the spring clip 10 between each transverse leg 14 and 16 and the spring web 12, the radius of curvature between the second web 24 and the detent portion 18 and the radius of curvature between the second web 24 and the flange 26 are substantially the same. Excellent results have also been obtained when the distance between the outer end of the flange 26 and the fulcrum are substantially equal to the width of the lever arm 22 thereat when it is in position in the space between the flange 26 and the adjacent end of the spring web 12 with the corresponding end of the lever arm 22 against the inner side of the second web 24.

The spring clip 10 has utility in fastening together abutting, flanged rim portions of adjacent parts or components of a structure. This is indicated in FIGS. 3 and 4 wherein there are shown adjacent portions of adjacent parts 30 and 32 of a structure such as, for example, a casing or housing and the like.

The first adjacent part of the structure 30 has a flanged rim portion 34 (see FIG. 3). The flanged rim portion 34 projects laterally from the first adjacent part 30. It has a face 36 with a longitudinally aligned groove 38 therein. On the side of the flanged rim portion 34 opposite the face 36, the back side, there is provided a peripheral bead portion 40 which may be formed, for example, by an undercut 42 in the back side of the flanged rim portion 34.

The second adjacent part 32 of the structure has a flanged rim portion 44 which likewise projects laterally therefrom. The flanged rim portion 44 comprises a face 46 which, when the adjacent parts 30 and 32 are in position, abuts the face 36 of the flanged rim portion 34 of the first adjacent part 30. The face 46 of the flanged rim portion 44 of the second adjacent part 32 comprises a tongue 48 which is seated in the groove 38 in the face 36 of the flanged rim portion 44 of the first adjacent part 30. The flanged rim portion 44 of the second adjacent part 32 likewise has on the back side thereof a peripheral bead 50. The peripheral bead 50 in this instance is formed by an undercut 52 in the back side of the flanged rim portion 44.

As may be seen from FIGS. 3 and 4 the flanged rim portions 34 and 44, when the component parts 30 and 32 are in proper position relative to each other, occur in corresponding positions. Indeed, it will be observed that the flanged rim portions 34 and 44 in the embodiment shown are specially adapted portions of the flanged rim 54 (of the first adjacent part 30) and 56 (of the second adjacent part 32). In each case the flanged rims 54 and 56 on both sides of the flanged rim portions 34 and 44 project outwardly beyond the ends and undercuts 42 and 52 of the flanged rim portions.

To fasten the first adjacent part 30 to the second adjacent part 32 at the flanged rim portions 34 and 44, a spring clip 10 is merely snapped into position. This position is shown in FIG. 3. It will be observed that when the spring clip 10 is in position the spring web 12 is disposed adjacent the ends of the flanged rim portions 34 and 44, the transverse leg 14 is in compressive engagement with the back side of the flanged rim portion 34 and the transverse leg 16 is in compressive engagement with the back side of the flanged rim portion 44. In each case, the detent portions 18 of the transverse leg 14 and transverse leg 16 are seated in the corresponding undercuts 42 and 52 with the corresponding peripheral beads 40 and 50 disposed between the detent portions 18 and the spring web 12. Moreover, each side of the spring clip 10 in the embodiment shown is disposed adjacent the outwardly projecting walls of the flanged rim 54 and 56.

Hence, substantial relative movement between the first component part 30 and the second component part 32 is prevented. Relative movement of the face 36 of the flanged rim portion 34 from the face 46 of the flanged rim portion 44 is resisted by the spring tension of spring clip 10 acting through the transverse legs 14 and 16. Relative outward movement between the component parts 30 and 32 is blocked by the tongue and groove arrangement provided by the tongue 48 and groove 38 in the respective faces 46 and 36. In addition, movement along a third axis (into the plane of the drawing of FIG. 3) is effectively blocked by the sides of the spring clip 10 and the outwardly projecting sidewalls of the flanged rims 54 and 56. Finally, the spring clip 10 is prevented from slipping off the flanged rim portions 34 and 44 by inwardly extending detent portion 18 on each transverse leg 14 and 16 in combination with the corresponding peripheral bead portion 40 and 50.

To remove the spring clip 10 from the flanged rim portions 34 and 44, all that need be done is to insert the blade of a screw driver into the opening between the outer end of the transverse flange 26 of a catch portion 20 of a transverse leg of the spring clip 10 and the adjacent end of the spring web 12 with a flat side of the screw driver blade parallel and against the inner side of the transverse flange 26. The outer end of the lever arm 22 (the screw driver handle) is then impelled in the direction of the opposite transverse leg. Under these conditions, it will be seen that the screw driver blade is a lever arm 22 of the first class lever type. The lever arm 22 works on a fulcrum at the end of the spring web 12 while the side of the lever arm 22 adjacent the transverse flange 26 forces the flange 26 outwardly. Hence, and with reference to FIG. 3, the spring tension of the spring web 12 is overcome to the extent that the relatively rigid transverse leg 16, for example, is flexed outwardly until the inwardly extending detent portion 18 thereof clears the adjacent peripheral bead 50. Further impelling of the lever arm 22 toward the opposite transverse leg functions merely to pivot the entire spring clip 10 on the inwardly extending detent portion 18 of the transverse leg 14 whereby the transverse leg 16 is removed from the flanged rim portion 44, thereby permitting the entire spring clip 10 to be removed.

Not only is the spring clip 10 useful in linking together or fastening together two adjacent parts of a structure but it also is useful as an attachment on a first structure for connecting the same to a second structure. For such uses, the spring web 12 may be provided with an aperture 60, as in FIG. 2, to enable the spring clip 10 to be attached by a threaded fastener, nail fastener and the like to said first structure.

A feature of advantage of the spring clip of this invention is the ease with which the same may be removed from a structure on which it is mounted in spring engagement. The spring clip of this invention makes it unnecessary to place a lever arm (such as, for example, the blade of a screw driver) between the spring web 12 and the subjacent portions of the structure on which the spring clip 10 is mounted for the purpose of prying loose the spring clip. Indeed, such action is relatively ineffective to remove the spring clip 10 from such an article. On the other hand, by providing a catch portion 20 on at least one transverse leg of the spring clip, the lever arm 22 may be inserted into the catch portion 20 and the spring clip levered out of position without damage to the underlying surface portion of the structure on which the spring clip 10 is mounted.

Another feature of advantage of the spring clip of this invention resides in the fact that it can be constructed out of any material of construction having structural strength and exhibiting a spring effect. Excellent results have been obtained when the spring clip is constructed out of spring steel. However, other materials and particularly plastics may be used instead.

These and other meritorious features, advantages, and embodiments will be apparent to those in the exercise of ordinary skill in the art upon reading the foregoing specification. Hence, it should be understood that the embodiments just described have been disclosed for purposes of illustration and not of restriction and that the scope of this invention is determined by the claims and not by the description preceding them. In addition, it should be understood that all embodiments of this invention, and modifications and variations thereof, which fall within the scope of a claim are intended to be embraced by that claim unless expressly excluded by language therein.

We claim:

1. A spring clip for use with a flange having oppositely directed beaded marginal edges overhanging opposite sides of the flange, comprising: an upwardly bowed and resistingly downwardly deflectable spring web provided with transverse relatively rigid legs integral with opposite ends of the web and extending below and away from the web, each leg having a pair of consecutive reversely curved sections of substantially equal radii with one section being an integral extension of the end of the web and forming a concave flange bead surrounding channel opening inwardly beneath the web toward the opposite leg and the second section forming a convex surface facing the opposite leg to bear against a flange over which the clip is received at the underside of the beaded edge of such flange, the radius upon which said upwardly bowed web is formed being substantially greater than the radii of said reversely curved sections of each leg, one leg having a third section forming an integral extension of the second section and extending outwardly beyond the end of the web from beneath the first and second sections and curving upwardly and extending inwardly terminating spaced outwardly adjacent the end of the web to define with the other sections an upwardly opening lever catch portion for removably receiving and engaging one end of a first class lever arm having a fulcrum in the area of the adjacent end of the web for enabling the leg to be flexed outwardly by flattening flexure of the web to allow springing embracement of the clip over a flange or removal therefrom, said upwardly bowed web being of sufficient resiliency in relation to the rigidity of the legs that spreading apart of the legs can occur substantially only through flattening flexure of the web, and said clip adapted to be sprung into embracing relation upon a flange with the bowed web somewhat flattened to tension the legs grippingly against opposite sides of such flange at the underside of the beaded marginal edges of the flange.

2. The invention as defined in claim 1 characterized in that each of said legs of the clip is provided with said third section whereby each leg has an upwardly opening lever catch portion.

References Cited in the file of this patent
UNITED STATES PATENTS

| | | |
|---|---|---|
| 735,453 | Bliven | Aug. 4, 1903 |
| 739,686 | Krupp | Sept. 22, 1903 |
| 944,022 | Eken | Dec. 21, 1909 |
| 986,506 | Sargent | Mar. 14, 1911 |
| 1,139,627 | Baltzley | May 18, 1915 |
| 2,160,009 | Walker | May 30, 1939 |
| 2,267,379 | Tinnerman | Dec. 23, 1941 |
| 2,303,031 | Dusevoir | Nov. 24, 1942 |
| 2,373,409 | Myer | Apr. 10, 1945 |
| 2,526,488 | Laichee | Oct. 17, 1950 |

FOREIGN PATENTS

| | | |
|---|---|---|
| 605,028 | Great Britain | July 14, 1948 |